United States Patent [19]

Johnson

[11] 4,309,718

[45] Jan. 5, 1982

[54] SERVICE SWITCH ARRANGEMENT FOR LOW LEVEL MATRIXING TYPE TELEVISION RECEIVER

[75] Inventor: Fred D. Johnson, Evanston, Ill.

[73] Assignee: Zenith Radio Corporation, Glenview, Ill.

[21] Appl. No.: 189,498

[22] Filed: Sep. 22, 1980

[51] Int. Cl.³ .............................................. H04N 9/62
[52] U.S. Cl. ...................................................... 358/10
[58] Field of Search .................... 358/10, 21 R, 29, 65

[56] References Cited

U.S. PATENT DOCUMENTS

| | | | |
|---|---|---|---|
| 3,612,757 | 10/1971 | Anderson | 358/10 |
| 3,670,095 | 6/1972 | Arumugham | 358/10 |
| 3,820,155 | 6/1974 | Neal | 358/10 |
| 3,959,811 | 5/1976 | Shanley | 358/10 |
| 4,118,729 | 10/1978 | Shanley | 358/10 |
| 4,123,776 | 10/1978 | Cochran | 358/10 |
| 4,272,777 | 6/1981 | Fitzgerald | 358/10 |

*Primary Examiner*—Michael A. Masinick
*Attorney, Agent, or Firm*—Jack Kail

[57] ABSTRACT

A service switch arrangement for a color television receiver having a low level matrixing system developing red, blue and green color signals includes a service switch having a normal position and a service position. In the normal position of the switch, a video output amplifier is enabled for coupling the red, blue and green color signals to the electron gun cathode elements of a color cathode ray tube. In the service position of the switch, the video output amplifier is disabled while an independently generated DC control voltage is coupled to the electron gun cathode elements for facilitating adjustment of the cut-off points of the cathode elements.

9 Claims, 2 Drawing Figures

SERVICE SWITCH ARRANGEMENT FOR LOW LEVEL MATRIXING TYPE TELEVISION RECEIVER

BACKGROUND OF THE INVENTION

The present invention relates to service arrangements for television receivers and, more particularly, to a service circuit for facilitating the adjustment of the cut-off points of the cathode elements of a color cathode ray tube.

Color television receivers normally employ a multi-gun color cathode ray tube with each one of the electron guns providing an electron beam activating the phosphors of a screen in a well known manner for reproducing a transmitted color image. The electron guns, the electron beams and the phosphor areas all vary with respect to one another in each manufactured cathode ray tube necessitating what is usually referred to as "setting-up" or adjusting the color cathode ray tube to achieve optimum operation. In particular, these adjustments typically involve a procedure whereby the bias potential applied to one or more of the cathode ray tube grids is set such that at least one of the electron gun cathode elements will cut-off at a predetermined level of video signal voltage.

In color television receivers using a high level matrixing system i.e. a receiver where the color difference signals are combined with the luminance signal in a high level output video amplifier stage to provide the red, blue and green color signals for driving the electron gun cathodes, the adjustment or "set-up" procedure is typically accomplished by coupling a predetermined DC control voltage or bias potential from the output of the video output amplifier to the cathode of each electron gun and then adjusting a potentiometer coupled to a cathode ray tube grid until at least one of the guns just begins producing an image on the screen. As a consequence, the cut-off point of the electron gun cathode has thereby been set to a video signal level corresponding to the predetermined DC control voltage. Potentiometers in the video amplifier output stage may subsequently be adjusted so that the other electron gun cathodes will also cut-off at the same predetermined DC control voltage. Various circuit arrangements have been proposed in the past for facilitating this adjustment procedure, most of these circuits having one feature in common. In particular, since the luminance signal component of the composite video signal is subject to unpredictable level variations due to the viewer operable brightness control, the luminance signal channel must be disabled to allow the development of the necessary predetermined DC control voltage at the output of the video output amplifier stage. Since the color difference signals, however, vary about relatively constant levels, they may be used to drive the output video amplifier for developing the predetermined DC control voltage.

In the prior art, the foregoing is typically accomplished by means of a so-called service switch which has a normal position wherein the luminance signal is coupled to the video output amplifier for enabling normal operation of the receiver and a service position in which the luminance channel is disabled and a fixed impedance is coupled instead to the video output amplifier, the fixed impedance in association with the relatively constant level color difference signals driving the amplifier for producing the predetermined DC control voltage. U.S. Pat. Nos. 3,670,095 to Arumugham et al and 3,820,155 to Neal are exemplary of such circuit arrangements. U.S. Pat. No. 3,612,757 teaches a similar circuit except that the matrixing of the color difference signals with the luminance signal is done in the cathode ray tube itself instead of in the video output amplifier. Other service switch arrangements used in high level matrixing systems are disclosed in U.S. Pat. Nos. 4,118,729 to Shanley II, 4,123,776 to Cochran et al and 4,130,829 to Kam et al.

The prior art service switch arrangements will not, however, normally be appropriate for use in a television receiver employing a low level matrixing system, i.e. a receiver where the color difference signals are combined with the luminance signal in a low level stage to provide the red, blue and green color signals which are in turn coupled through a high level video output amplifier for driving the electron gun cathodes. In such systems, all of the color signals coupled to the video output amplifier include components directly affected by the viewer brightness control so that their levels are not predictable. It is, accordingly, a primary object of the present invention to provide a service arrangement for enabling adjustment of the cut-off points of the electron gun cathode elements in a color television receiver using a low level matrixing system. It is a further object of the invention to provide an arrangement of the foregoing type which may be inexpensively manufactured and which uses a minimum number of electrical components.

BRIEF DESCRIPTION OF THE DRAWINGS

The features of this invention which are believed to be novel are set forth with particularity in the appended claims. The invention together with its further objects and advantages thereof, may best be understood, however, by reference to the following description taken in conjunction with the accompanying drawings, in which like reference numerals refer to like elements in the several figures and in which:

DESCRIPTION OF THE PREFERRED EMBODIMENT

Figure 1:
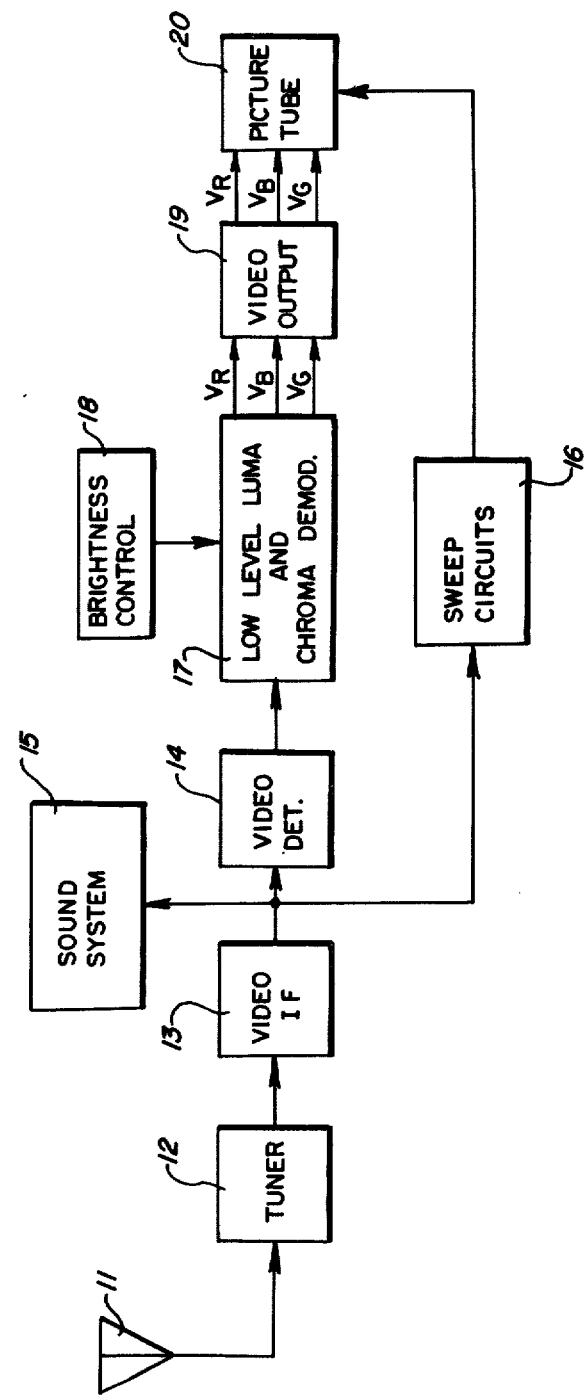
FIG. 1 is a block diagram of a color television receiver employing the service switch arrangement of the invention.

Referring now to FIG. 1, a color television receiver is shown which embodies a service switch circuit in accordance with the present invention. The receiver includes an antenna 11 coupled to an input tuner stage 12 which amplifies the received signals and converts the same to intermediate-frequency signals in the well-known manner. The amplified and converted signals are coupled to an intermediate-frequency (IF) amplifier 13 where they are further amplified and then coupled to a video detector 14, and also to a sound system 15 and an arrangement of sweep circuits 16. The output of video detector 14 comprises a composite video signal including both chrominance and luminance signal components. The composite video signal is coupled to a low level luminance and chroma demodulator 17 in which the chrominance and luminance signals are matrixed to provide a red color signal, a blue signal and a green signal. In addition, the level of the luminance signal component of the composite video signal may be adjusted by a viewer operable brightness control 18 for setting the brightness of the reproduced image. The red, blue and green color signals developed at the output of low level luminance and chroma demodulator 17 are coupled to a high level video output amplifier 19 which includes the service switch arrangement of the present invention. Under normal operating conditions, video output amplifier 19 amplifies the color signals and couples the amplified signals to the electron gun cathode elements of a color cathode ray tube 20. Cathode ray tube 20 produces a viewable color image in response to the amplified color signals and the output of sweep circuits 16 in a manner well understood in the art. Under service conditions, each of the color signals developed at the outputs of video output amplifier 19 is replaced by a predetermined DC control voltage for facilitating the adjustment of the cut-off point of cathode ray tube 20 as explained below.

Figure 2:
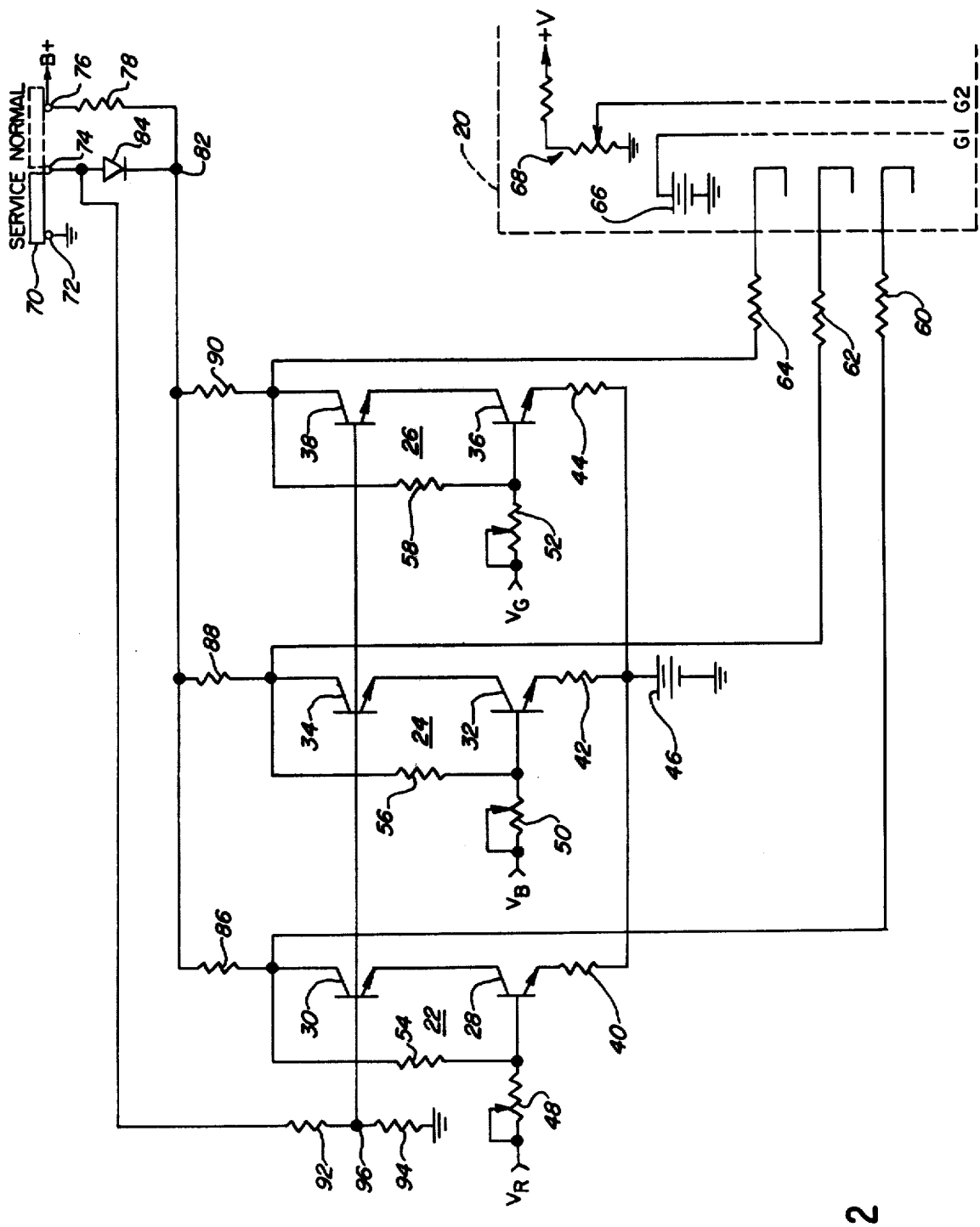
FIG. 2 is a detailed schematic diagram of the video output amplifier and service switch arrangement of FIG. 1.

FIG. 2 illustrates in detail the construction of video output amplifier 19 together with the service switch arrangement of the invention embodied therein. In particular, video output amplifier 19 comprises three identical amplification stages 22, 24 and 26 each adapted for amplifying and coupling a respective one of the color signals to a corresponding cathode of cathode ray tube 20. Thus, amplification stage 22 comprises a pair of transistors 28 and 30 connected in a cascode arrangement, amplification stage 24 comprises a pair of transistors 32 and 34 connected in a similar cascode arrangement and amplification stage 26 comprises a further pair of transistors 36 and 38 connected in the same cascode arrangement. Each of the transistors 30, 34 and 38 is a high power device capable of processing signals having a peak to peak voltage of up to about 150 volts. The emitters of transistors 28, 32 and 36 are coupled by a series of emitter resistors 40, 42 and 44 respectively to a source of bias potential 46 while the base terminals of the transistors are connected through a series of level adjusting potentiometers 48, 50 and 52 respectively for receiving the red, blue and green color signals. The collector terminal of each of the transistors 30, 34 and 38 is connected by one of a series of feed back resistors 54, 56 and 58 respectively to the base of its associated one of the transistors 28, 32 and 36 and also through one of a series of resistors 60, 62 and 64 respectively to one of the cathode elements of cathode ray tube 20. Cathode ray tube 20 also includes a first grid G1 connected to a source of constant bias potential 66 and a second grid G2 connected to the slider of a potentiometer assembly 68.

The service switch arrangement of the invention includes an operating member 70 having a service position interconnecting a pair of contact terminals 72 and 74 and a normal position connecting contact terminal 74 to an additional contact terminal 76. Contact terminal 72 is connected to a source of ground potential while contact terminal 76 is connected to a high level supply of DC voltage preferably on the order of about 220 volts. A voltage divider comprising a resistor 78 and the parallel combination of series resistors 52, 58 and 90, series resistors 50, 56 and 88 and series resistors 48, 54 and 86 is connected between terminal 76 and the color signal inputs $V_G$, $V_B$ and $V_R$ respectively for developing a preselected control voltage at a node 82. Contact terminal 74 is connected through a diode 84 to node 82, the cathode of diode 84 being connected through resistors 86, 88 and 90 to the collector terminals of transistors 30, 34 and 38 respectively and the anode of diode 84 being connected to a voltage divider comprising a pair of resistors 92 and 94 forming a common node 96 therebetween which is connected to the base terminals of each of the transistors 30, 34 and 38.

In the normal position of operating member 70, represented by the dotted lines, video output amplifier 19 is operated in its normal mode for coupling the color signals to the cathode elements of cathode ray tube 20. In particular, with operating member 70 in its normal position, diode 84 is forward biased and the supply voltage B+ is coupled from contact terminals 76 and 74 to the voltage divider comprising resistors 92 and 94 for biasing the base terminals of transistors 30, 34 and 38, the supply voltage B+ also being coupled through diode 84 and resistors 86, 88 and 90 for biasing the collector terminals of the transistors. The transistors 30, 34 and 38 are thereby rendered operative for coupling the color signals from their collector terminals through resistors 60, 62 and 64 to the cathode element of cathode ray tube 20.

When operating member 70 is moved to its service position contact terminal 74 is connected to ground potential reverse biasing diode 84 thereby isolating the control voltage developed at node 82 from ground. As a consequence, node 96 of the voltage divider comprising resistors 92 and 94 is held at ground potential inhibiting the operation of transistors 30, 34 and 38 while the preselected voltage developed at node 82 results in the development of fixed voltage signals at the collectors of transistors 30, 34 and 38. The fixed voltage thereby established at the collector of each of the transistors 30, 34 and 38 is applied to the cathode elements of cathode ray tube 20 through resistors 60, 62 and 64. At this time, the cathode G2 grid bias potentiometer 68 is adjusted until at least one of the electron guns embodying the cathode elements begins to conduct. The conducting gun is thereby set to a cut-off voltage corresponding to the control voltage established at the collectors of transistors 30, 34 and 38. Operating member 70 is now returned to its normal position wherein video output amplifier 19 is again enabled for normal operation. The level adjustment or background controls 48, 50 and 52 may now be adjusted if necessary to insure that all three cathodes conduct simultaneously.

What has thus been shown in an improved service switch arrangement for facilitating adjustment of the cut-off point of a color cathode ray tube used in conjunction with a television receiver having a low level matrixing system. During the service mode of operation of the circuit, operation of the video output amplifier is completely inhibited for decoupling the color signals, which may contain luminance signal components of unknown levels, from the electron gun cathode elements of the color cathode ray tube. At the same time, an independently generated DC control signal is coupled to the collectors of the non-conducting output transistors and therefrom to the electron gun cathode elements for facilitating the cut-off point adjustment procedure.

While a particular embodiment of the invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. In a television receiver of the type having a low level matrixing system developing red, blue and green color signals and a high level output amplifier including a plurality of stages each coupling a respective one of said color signals to a cathode of a color cathode ray tube, the improvement comprising:

switch means having a first terminal connected to a source of ground potential a second terminal connected to a high level supply of DC voltage and a common terminal, said switch means including an operating member having a normal position interconnecting said second and common terminals and a service position interconnecting said first and common terminals;

means coupled to said second terminal for developing a DC control voltage having a value less than said high level DC supply voltage; and circuit means coupled to said common terminal and to said control voltage developing means, said circuit means being responsive to the normal position of said operating member for enabling the operation of each of said output amplifier stages and responsive to the service position of said operating member for inhibiting the operation of each of said output amplifier stages while coupling said control voltage to each of said cathodes for facilitating the adjustment of the cut-off point of said cathode ray tube.

2. The improvement according to claim 1 wherein said circuit means comprises means for isolating said control voltage from said source of ground potential when said operating member is in said service position.

3. The improvement according to claim 2 wherein said control voltage developing means comprises a voltage divider having a common node developing said control voltage.

4. The improvement according to claim 3 wherein said means for isolating comprises a diode connected between said source of ground potential and said voltage divider common node when said operating member is in said service position.

5. The improvement according to claim 2 wherein each of said output stages comprises an output transistor having a base terminal and having a collector terminal coupled to a respective one of said cathodes, said circuit means comprising first conducting means coupling said common terminal to the base terminal of each of said output transistors, second conducting means coupling said control voltage to the collector terminal of each of said output transistors and diode means connected between said first and second means.

6. In a television receiver of the type having a low level matrixing system developing red, blue and green color signals and a high level output amplifier including a plurality of output transistors each coupling a respective one of said color signals from its collector terminal to a cathode of a color cathode ray tube, the improvement comprising:

switch means having a first terminal connected to a source of ground potential, a second terminal connected to a high level supply of DC voltage and a common terminal, said switch means including an operating member having a normal position interconnecting said second and common terminals and a service position interconnecting said first and common terminals;

means coupled to said second terminal for developing a DC control voltage having a value less than said high level DC supply voltage; and circuit means coupled to said common terminal and to said control voltage developing means, said circuit means being responsive to the normal position of said operating member for coupling said high level supply of DC voltage to the base and collector terminals of each of said output transistors for enabling the operation thereof and responsive to the service position of said operating member for coupling said source of ground potential to the base terminal of each of said output transistors for inhibiting the operation thereof while coupling said control voltage to the collector terminal of each of said output transistors for facilitating the adjustment of the cut-off point of said cathode ray tube.

7. The improvement according to claim 6 wherein said circuit means comprises means for isolating said control voltage from said source of ground potential when said operating member is in said service position.

8. The improvement according to claim 7 wherein said control voltage developing means comprises a voltage divider having a common node developing said control voltage, said means for isolating comprising a diode connected between said common terminal of said switch means and said common node of said voltage divider.

9. The improvement according to claim 8 wherein said circuit means comprising first conducting means coupled between said common terminal of said switch means and the base terminals of each of said output transistors and second conducting means connected between said common node of said voltage divider and the collector terminals of each of said output transistors.

* * * * *